US012681159B2

(12) United States Patent
Kurono et al.

(10) Patent No.: US 12,681,159 B2
(45) Date of Patent: Jul. 14, 2026

(54) RADAR DEVICE AND AZIMUTH ESTIMATION METHOD

(71) Applicant: DENSO CORPORATION, Kariya-city (JP)

(72) Inventors: Yasuhiro Kurono, Kariya-city (JP); Takuya Takayama, Kariya-city (JP); Yutaka Hasegawa, Kariya-city (JP); Masatada Hokiguchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 282 days.

(21) Appl. No.: 18/584,868

(22) Filed: Feb. 22, 2024

(65) Prior Publication Data

US 2024/0264297 A1     Aug. 8, 2024

Related U.S. Application Data

(63) Continuation of application No. PCT/JP2022/031517, filed on Aug. 22, 2022.

(30) Foreign Application Priority Data

Aug. 24, 2021    (JP) ................................. 2021-136369

(51) Int. Cl.
| | |
|---|---|
| *G01S 13/42* | (2006.01) |
| *G01S 13/86* | (2006.01) |
| *G01S 13/931* | (2020.01) |

(52) U.S. Cl.
CPC ............ *G01S 13/42* (2013.01); *G01S 13/867* (2013.01); *G01S 13/931* (2013.01)

(58) Field of Classification Search
CPC ....... G01S 13/42; G01S 13/867; G01S 13/931
See application file for complete search history.

(56) References Cited

U.S. PATENT DOCUMENTS

| | | | | |
|---|---|---|---|---|
| 2016/0054439 A1* | 2/2016 | Brookner | ................ | G01S 13/91 |
| | | | | 342/36 |
| 2019/0353771 A1* | 11/2019 | Kurono | ................... | G01S 13/68 |
| 2019/0391230 A1* | 12/2019 | Loesch | ................... | G01S 13/42 |
| 2021/0028826 A1 | 1/2021 | Takahashi | | |
| 2022/0268883 A1* | 8/2022 | Wu | ........................... | G01S 3/14 |

FOREIGN PATENT DOCUMENTS

| | | | | |
|---|---|---|---|---|
| KR | 101468548 B1 * | 12/2014 | ............... | G01S 3/16 |

OTHER PUBLICATIONS

KR_101468548_B1_I_translate.pdf (Year: 2014).*

* cited by examiner

*Primary Examiner* — Yonghong Li
*Assistant Examiner* — Vladimir Magloire
(74) *Attorney, Agent, or Firm* — Precision Patents, P.C.

(57) ABSTRACT

A radar device according to one aspect of the present disclosure includes a plurality of transmitting antennas, a plurality of receiving antennas, a first azimuth estimation unit, a second azimuth estimation unit, and a selection unit. The first azimuth estimation unit estimates a first azimuth by coherently processing first received signals received by a virtual array. The second azimuth estimation unit estimates a second azimuth by, between transmissions or receptions, coherently processing second received signals received by an antenna array. The selection unit adopts the first azimuth or the second azimuth depending on the ambient environment and/or the detected situation of the target.

11 Claims, 17 Drawing Sheets

| Tx | Tx1 | Tx1 | Tx2 | Tx2 | Tx3 | Tx3 |
|---|---|---|---|---|---|---|
| Rx | Rx1 | Rx2 | Rx1 | Rx2 | Rx1 | Rx2 |
| Tx PHASE | $0 * \alpha$ | $0 * \alpha$ | $2 * \alpha$ | $2 * \alpha$ | $4 * \alpha$ | $4 * \alpha$ |
| Rx PHASE | $0 * \alpha$ | $1 * \alpha$ | $0 * \alpha$ | $1 * \alpha$ | $0 * \alpha$ | $1 * \alpha$ |
| TOTAL PHASE | $0 * \alpha$ | $1 * \alpha$ | $2 * \alpha$ | $3 * \alpha$ | $4 * \alpha$ | $5 * \alpha$ |

200

| Tx | Tx1 | Tx1 | Tx1 | Tx1 | Tx1 | Tx1 |
|---|---|---|---|---|---|---|
| Rx | Rx1 | Rx2 | Rx3 | Rx4 | Rx5 | Rx6 |
| Tx PHASE | $0 * \alpha$ | $0 * \alpha$ | $0 * \alpha$ | $0 * \alpha$ | $0 * \alpha$ | $0 * \alpha$ |
| Rx PHASE | $0 * \alpha$ | $1 * \alpha$ | $2 * \alpha$ | $3 * \alpha$ | $4 * \alpha$ | $5 * \alpha$ |
| TOTAL PHASE | $0 * \alpha$ | $1 * \alpha$ | $2 * \alpha$ | $3 * \alpha$ | $4 * \alpha$ | $5 * \alpha$ |

| Tx | Tx1 | Tx1 | Tx2 | Tx2 | Tx3 | Tx3 |
|---|---|---|---|---|---|---|
| Rx | Rx1 | Rx2 | Rx1 | Rx2 | Rx1 | Rx2 |
| Tx PHASE | $0 * \alpha$ | $0 * \alpha$ | $2 * \alpha$ | $2 * \alpha$ | $4 * \alpha$ | $4 * \alpha$ |
| Rx PHASE | $0 * \beta$ | $1 * \beta$ | $0 * \beta$ | $1 * \beta$ | $0 * \beta$ | $1 * \beta$ |
| TOTAL PHASE | $0 * \alpha + 0 * \beta$ | $0 * \alpha + 1 * \beta$ | $2 * \alpha + 0 * \beta$ | $2 * \alpha + 1 * \beta$ | $4 * \alpha + 0 * \beta$ | $4 * \alpha + 1 * \beta$ |

AMBIENT ENVIRONMENT⋯CURVATURE RADIUS OF ROAD

DETECTED SITUATION⋯DISTANCE TO TARGET

AMBIENT ENVIRONMENT···CURVATURE RADIUS OF ROAD

DETECTED SITUATION···DISTANCE TO TARGET

RADAR DEVICE AND AZIMUTH ESTIMATION METHOD

CROSS-REFERENCE OF RELATED APPLICATIONS

This application is the U.S. bypass application of International Application No. PCT/JP2022/031517 filed on Aug. 22, 2022, which designated the U.S. and claims priority to Japanese Patent Application No. 2021-136369 filed on Aug. 24, 2021, the contents of both of which are incorporated herein by reference.

BACKGROUND

Technical Field

The present disclosure relates to a radar device.

Description of the Related Art

A radar device is known. For example, a radar device performs azimuth estimation based on multi-input and multi-output (MIMO). Specifically, the radar device uses a steering vector defined based on both a transmission azimuth and a reception azimuth to perform two-dimensional azimuth estimation for the transmission azimuth and the reception azimuth, and identifies a signal having a reception azimuth different from its transmission azimuth. The radar device corrects a correlation matrix based on the identified signal so as to prevent the accuracy of azimuth estimation from decreasing due to detection of a false azimuth in which no object is located.

SUMMARY

A radar device according to one aspect of the present disclosure includes a plurality of transmitting antennas, a plurality of receiving antennas, a first azimuth estimation unit, a second azimuth estimation unit, and a selection unit. The first azimuth estimation unit is configured to estimate a first azimuth by coherently processing first received signals received by a virtual array. The virtual array includes the plurality of transmitting antennas and the plurality of receiving antennas. The first azimuth is the azimuth of a target. The second azimuth estimation unit is configured to estimate a second azimuth by, between transmissions or receptions, coherently processing second received signals received by an antenna array. The antenna array includes at least one set of antennas. The at least one set of antennas includes the plurality of transmitting antennas and one of the plurality of receiving antennas, or the plurality of receiving antennas and one of the plurality of transmitting antennas. The selection unit is configured to adopt one of the first azimuth and the second azimuth depending on the ambient environment and/or the detected situation of the target.

An antenna device according to one aspect of the present disclosure includes a first azimuth calculation unit and a second azimuth calculation unit. The first azimuth calculation unit calculates the first azimuth based on the first received signals received by the virtual array of more antennas. Although the first received signals are affected by the difference between the transmission azimuth and the reception azimuth, the first azimuth is higher in resolution because the virtual array has more antennas. The second azimuth calculation unit calculates the second azimuth based on the second received signals unaffected by the difference between the transmission azimuth and the reception azimuth. In addition, one of the first azimuth and the second azimuth is adopted depending on the ambient environment and/or the detected situation of the target. The adoption of the first azimuth or the second azimuth depending on the ambient environment and/or the detected situation of the target enables the processing load to be reduced compared with a case in which two-dimensional azimuth estimation is conducted. Therefore, the processing load can be reduced as well as the accuracy of azimuth estimation can be increased.

An azimuth estimation method according to another aspect of the present disclosure transmits transmission waves from a plurality of transmitting antennas, estimates a first azimuth by coherently processing first received signals received by a virtual array, estimates a second azimuth by, between transmissions or receptions, coherently processing second received signals received by an antenna array, and adopts one of the first azimuth and the second azimuth depending on the ambient environment and/or the detected situation of the target. The virtual array includes the plurality of transmitting antennas and the plurality of receiving antennas. The first azimuth is the azimuth of a target. The antenna array includes at least one set of antennas. The at least one set of antennas includes the plurality of transmitting antennas and one of the plurality of receiving antennas or one of the plurality of transmitting antennas and the plurality of receiving antennas.

The azimuth estimation method according to the aspect of the present disclosure achieves the same effects as the above-described radar device.

DETAILED DESCRIPTION OF THE
PREFERRED EMBODIMENTS

The radar device described in WO 2019/155625 A performs azimuth estimation based on multi-input and multi-output (MIMO). Specifically, the radar device uses a steering vector defined based on both a transmission azimuth and a reception azimuth to perform two-dimensional azimuth estimation for the transmission azimuth and the reception azimuth, and identifies a signal having a reception azimuth different from its transmission azimuth. The radar device corrects a correlation matrix based on the identified signal so as to prevent the accuracy of azimuth estimation from decreasing due to detection of a false azimuth in which no object is located.

Detailed research carried out by the present inventors has revealed that because the radar device uses a steering vector defined based on both a transmission azimuth and a reception azimuth to perform two-dimensional azimuth estimation, the processing load is high, which makes it challenging to perform two-dimensional azimuth estimation for all detected azimuths.

Embodiments of the present disclosure will now be described with reference to the drawings.

1. First Embodiment

<1-1. Configuration of Radar Device>

Figure 1:
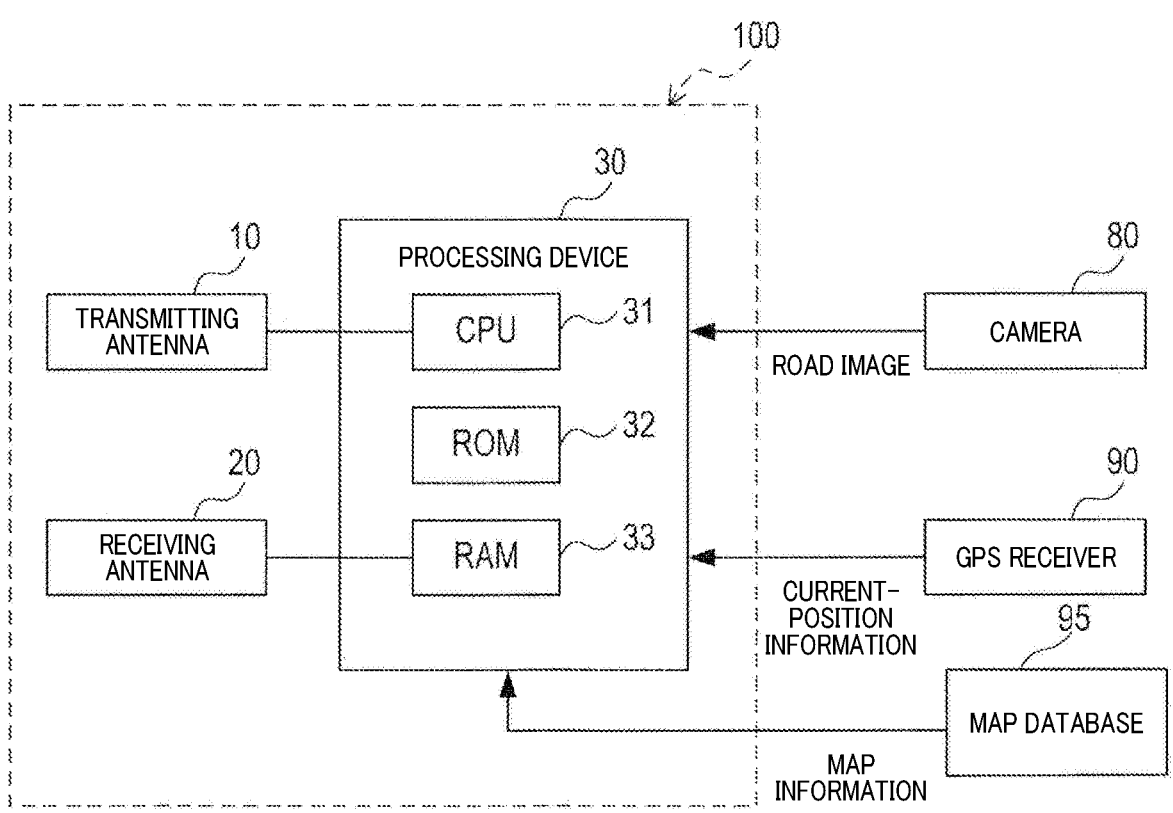
FIG. 1 is a schematic block diagram of a radar device according to an embodiment.

The configuration of a radar device 100 according to the present embodiment will be described with reference to FIG. 1.

The radar device 100 includes a transmitting antenna unit 10, a receiving antenna unit 20, and a processing device 30. The radar device 100 is connected to a camera 80, a GPS receiver 90, and a map database 95. In the present embodiment, the radar device 100 is mounted to a moving object (specifically, a vehicle 50).

The processing device 30 includes a CPU 31, a ROM 32, and a RAM 33, and the CPU 31 executes programs stored in the ROM 32 to implement various functions. These functions may not be implemented using software. Some or all of the functions may be implemented using hardware including a combination of a logic circuit and an analog circuit.

The processing device 30 is connected with the camera 80 and the GPS receiver 90. The camera 80 captures an image of the road ahead being traveled by the vehicle 50 and outputs the road image to the processing device 30. The GPS receiver 90 receives current-position information on the vehicle 50 from GPS satellites and outputs the current-position information to the processing device 30. The processing device 30 is connected to a database 95 that stores map information, and the processing device 30 acquires the map information from the database 95.

The processing device 30 provides a transmission signal having a predetermined frequency to the transmitting antenna unit 10. The processing device 30 also processes a received signal output from the receiving antenna unit 20 to calculate, for example, the azimuth of a target relative to the radar device 100, the distance from the radar device 100 to the target, and the speed of the target relative to the radar device 100.

The transmitting antenna unit 10 includes M transmitting antennas Txm (M is an integer greater than or equal to two, and m=1, . . . , M). The receiving antenna unit 20 includes N receiving antennas Rxn (N is an integer greater than or equal to two, and n=1, . . . , N). The radar device 100 is a multi-input and multi-output (MIMO) radar device that transmits and receives radio waves with a plurality of antennas at the same time.

Figure 2:
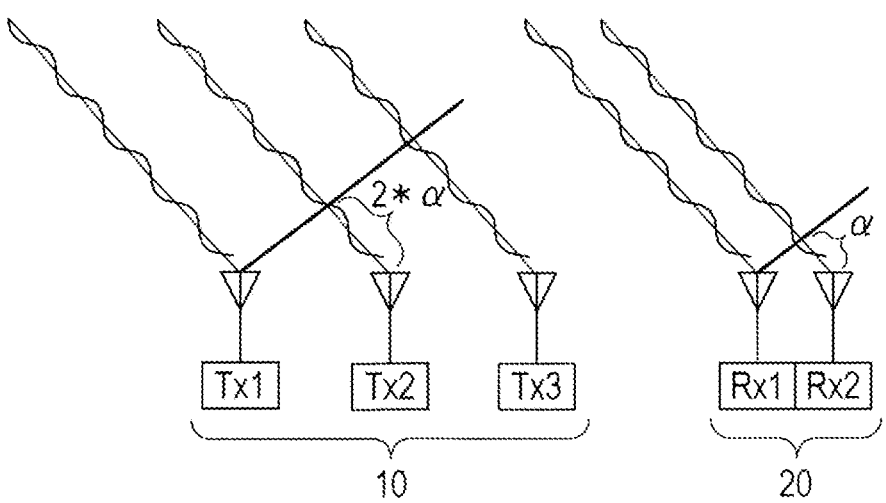
FIG. 2 illustrates the phases of signals received by virtual antennas including three transmitting antennas and two receiving antennas.

FIG. 2 illustrates an example with the transmitting antenna unit 10 according to the present embodiment including three transmitting antennas Tx1, Tx2, and Tx3. The transmitting antennas Tx1, Tx2, and Tx3 repeatedly transmit transmission waves at the same time in a predetermined transmission azimuth based on the transmission signal provided from the processing device 30.

The transmitting antennas Tx1, Tx2, and Tx3 are arranged in a row at intervals Da in a predefined arrangement direction. The transmitting antennas Tx1, Tx2, and Tx3 transmit transmission waves having a predetermined frequency in the predetermined transmission azimuth from the transmitting antennas Tx1, Tx2, and Tx3. The transmitting antennas Tx1, Tx2, and Tx3 are arranged with a 2xα phase difference between adjacent antennas in the path to the target.

FIG. 2 illustrates an example with the receiving antenna unit 20 according to the present embodiment including two receiving antennas Rx1 and Rx2. The receiving antennas Rx1 and Rx2 are arranged in a row at intervals Da in a predefined arrangement direction. The receiving antennas Rx1 and Rx2 receive reflected waves with a predetermined frequency coming from a predetermined arrival azimuth (i.e., a reception azimuth) and outputs a received signal. The receiving antennas Rx1 and Rx2 are arranged with an a phase difference between adjacent antennas in the path from the target.

The receiving antennas Rx1 and Rx2 each receive the reflected waves generated when the transmission waves transmitted from the transmitting antennas Tx1, Tx2, and Tx3 are reflected by the target. The receiving antennas Rx1 and Rx2 each repeatedly receive three reflected waves that are out of phase with each other by 2xα and repeatedly output three received signals that are out of phase with each other by 2xα.

The receiving antenna Rx2 is out of phase with the receiving antenna Rx1 by α. Thus, as illustrated in FIG. 2, the receiving antenna unit 20 outputs six received signals that are out of phase with each other by α. In the present embodiment, the phase difference Δφ2 of the N receiving antennas Rxn is 1/N of the phase difference Δφ1 of the M transmitting antennas Txm. The receiving antenna unit 20 accordingly outputs M×N received signals that are out of phase with each other by Δφ2.

Figure 3:
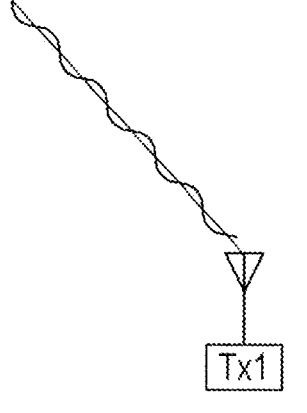
FIG. 3 illustrates the phases of signals received by six receiving antennas.
Figure 3:
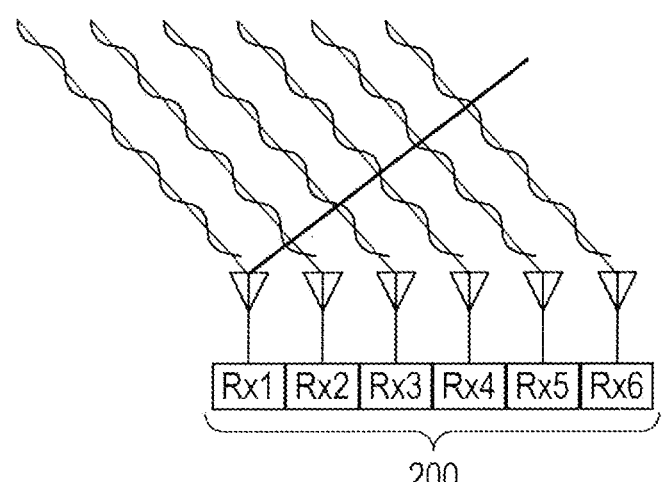

The received signals output from the receiving antenna unit 20 are equal to received signals output from six receiving antennas Rx1, Rx2, Rx3, Rx4, Rx5, and Rx6 illustrated in FIG. 3. The six receiving antennas Rx1, Rx2, Rx3, Rx4, Rx5, and Rx6 illustrated in FIG. 3 are arranged in a predetermined arrangement direction with a phase difference of a between adjacent antennas in the path from the target.

That is, the radar device 100 virtually forms M×N receiving antennas from the M transmitting antennas Txn and the N receiving antennas Rxn. Hereinafter, the M×N virtual receiving antennas formed by the radar device 100 are referred to as a virtual array.

By forming the virtual array from the M+N antennas, the radar device 100 achieves substantially the same azimuth resolution as a radar device including one transmitting antenna and M×N receiving antennas.

<1-2. Decrease in Accuracy of MIMO-Based Azimuth Estimation>

Figure 4:
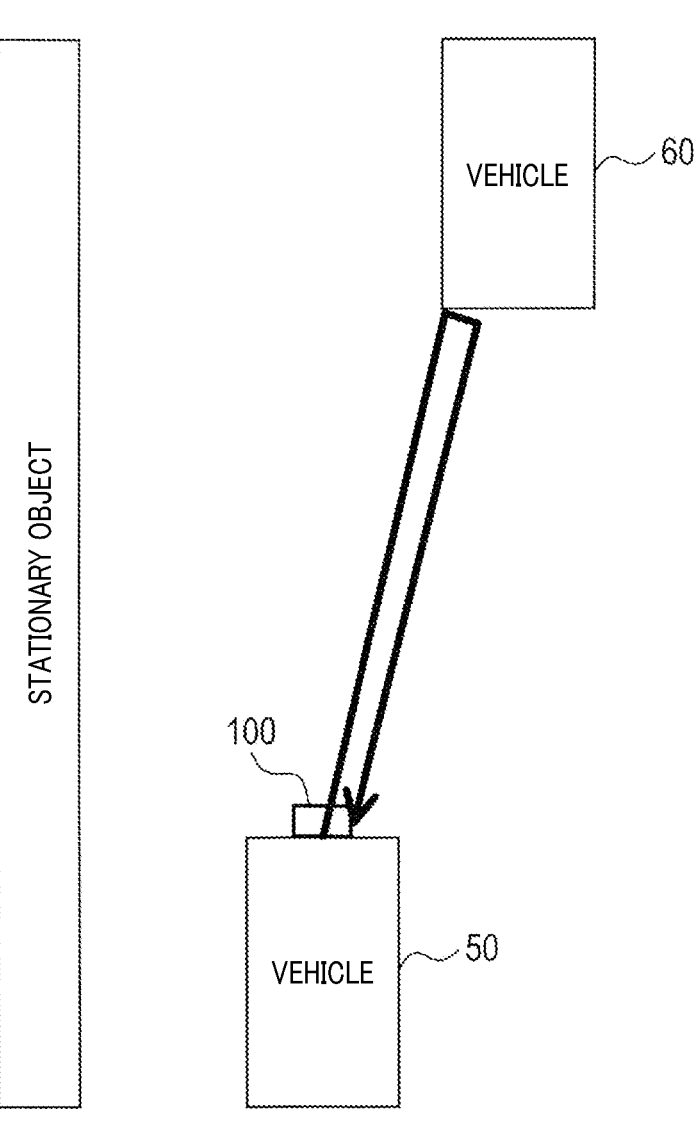
FIG. 4 illustrates an example of a situation in which the transmission azimuth is the same as the reception azimuth and no ghosting occurs.
Figure 5:
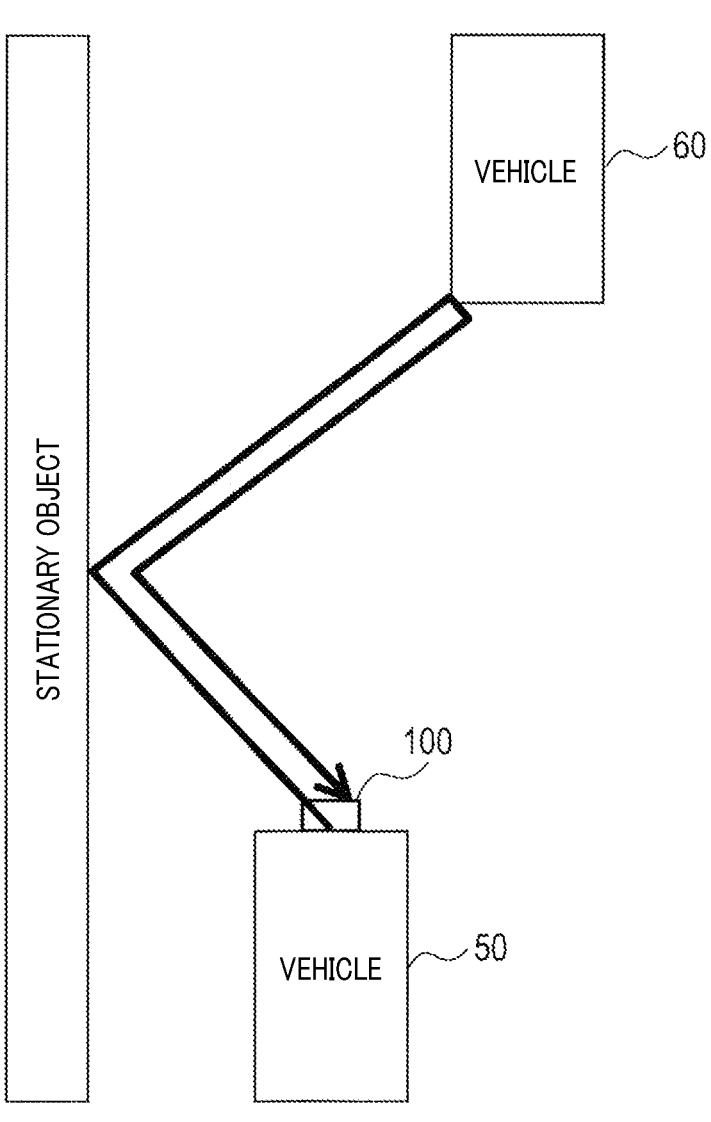
FIG. 5 illustrates another example of a situation in which the transmission azimuth is the same as the reception azimuth and no ghost occurs.

The radar device 100 processes the received signals received by the formed virtual array to estimate the azimuth of the target. As illustrated in FIGS. 4 and 5, when the transmission azimuth of the transmission waves coincides with the reception azimuth of the reflected waves (i.e., the direction from which the reflected waves come), the radar device 100 can estimate the azimuth with high resolution and high accuracy.

Figure 6:
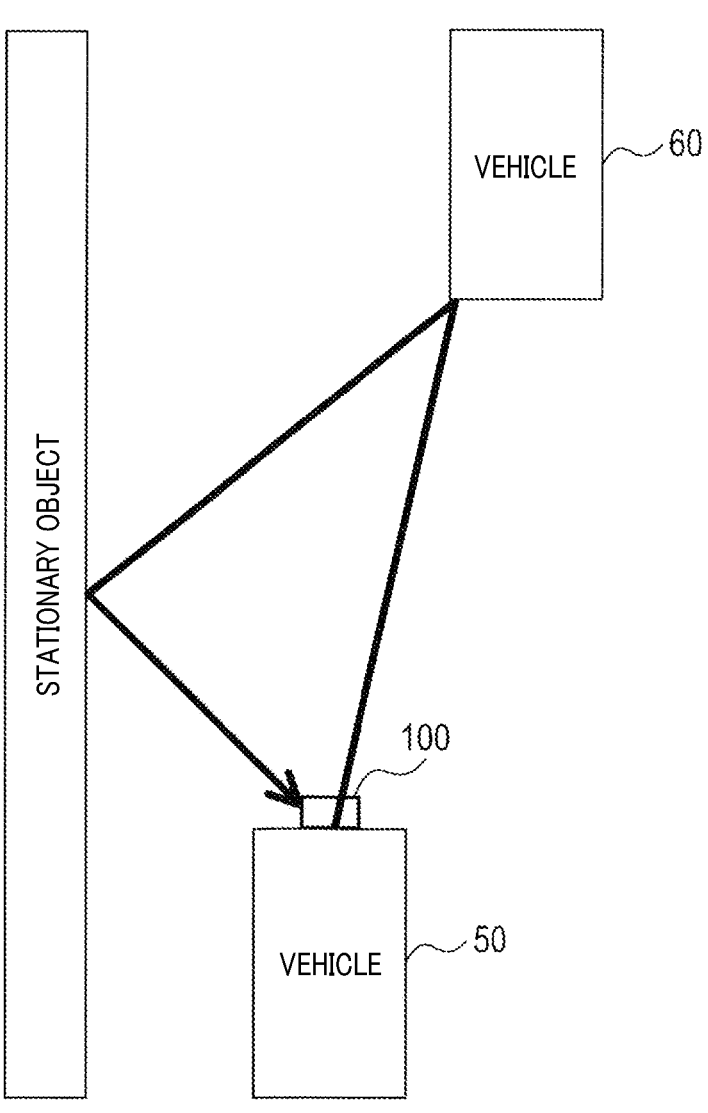
FIG. 6 illustrates an example of a situation in which the transmission azimuth is different from the reception azimuth and a ghosting occurs.
Figure 7:
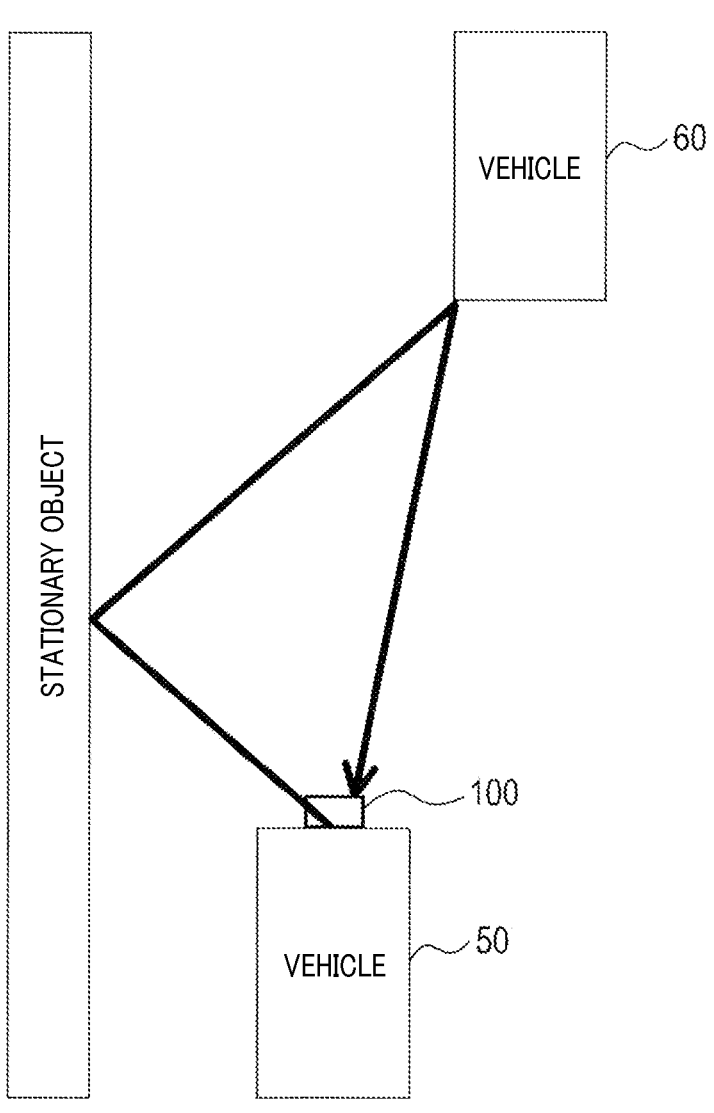
FIG. 7 illustrates another example of a situation in which the transmission azimuth is different from the reception azimuth and a ghost occurs.
Figure 8:
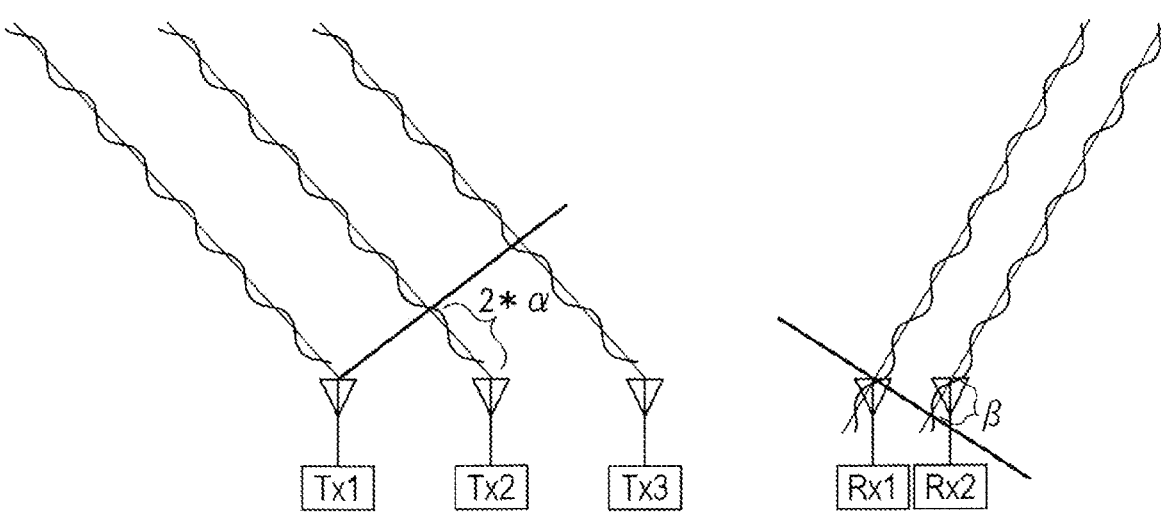
FIG. 8 illustrates the phases of received signals at virtual antennas in a case in which the transmission azimuth is different from the reception azimuth.

However, as illustrated in FIGS. 6 and 7, when the transmission azimuth is different from the reception azimuth, the accuracy of target azimuth estimation is likely to decrease. As illustrated in FIG. 8, when the reflected waves arrive at the receiving antennas Rx1 and Rx2 from an azimuth different from the transmission azimuth, the phase difference between the receiving antenna Rx1 and the receiving antenna Rx2 changes from a to R in the path from the target. The phase difference between the M×N received signals thus varies, resulting in a decrease in the accuracy of azimuth estimation.

Figure 9:
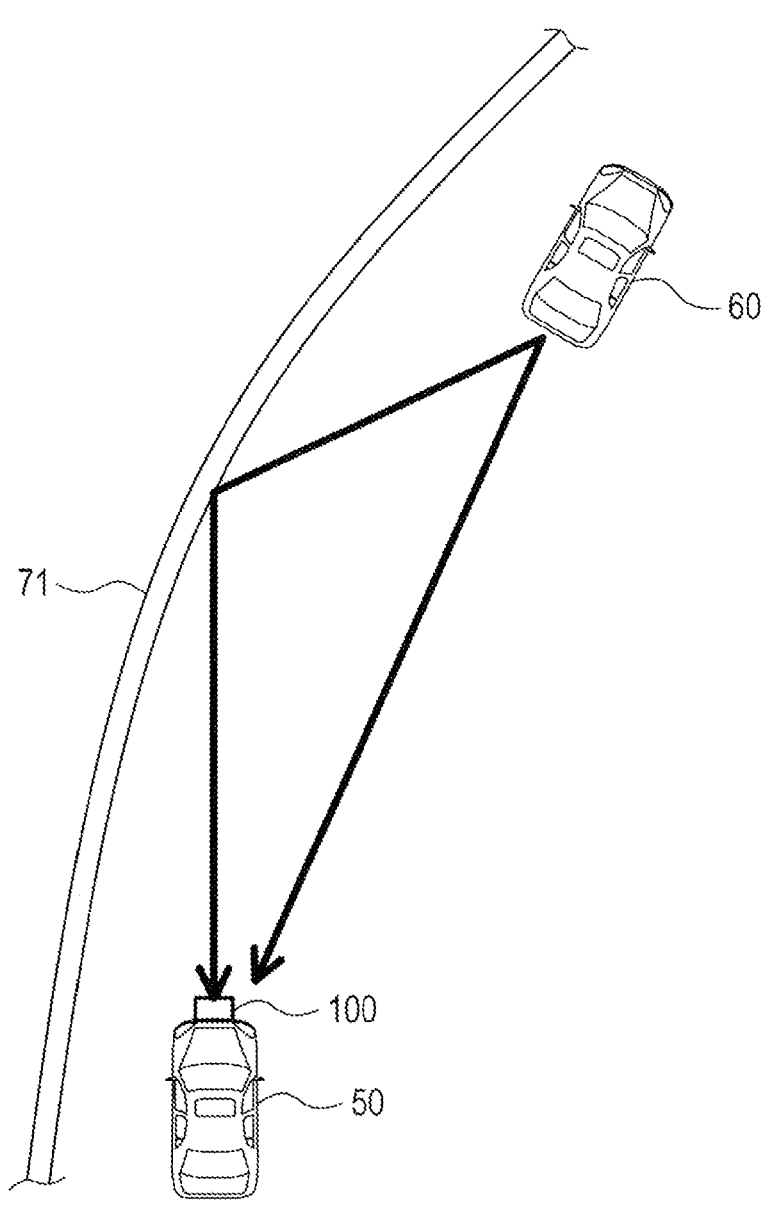
FIG. 9 illustrates an example of a situation in which the accuracy of azimuth estimation is likely to decrease when the transmission azimuth is different from the reception azimuth.
Figure 10:
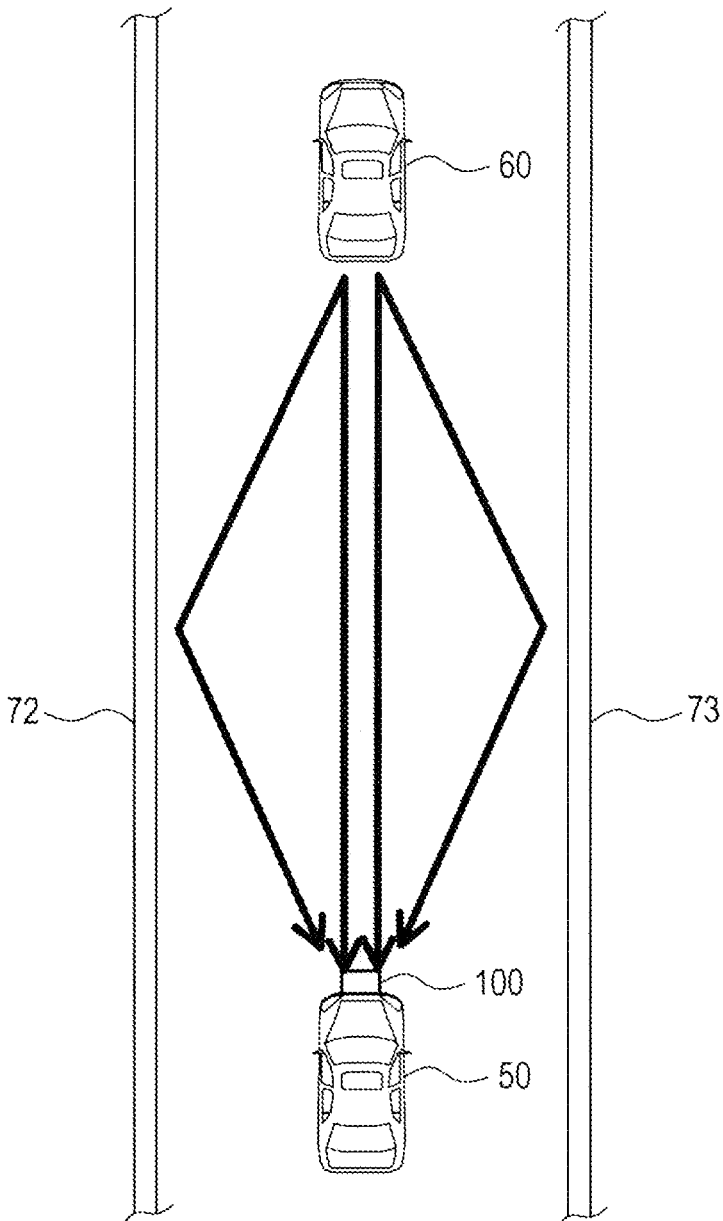
FIG. 10 illustrates another example of a situation in which the accuracy of azimuth estimation is likely to decrease when the transmission azimuth is different from the reception azimuth.

Specifically, in the ambient environments illustrated in FIGS. 9 and 10, received signals for the same transmission and reception azimuth tend to be affected by received signals for different transmission and reception azimuths. As a result, the accuracy of MIMO-based azimuth estimation decreases.

FIG. 9 illustrates a situation in which the vehicle 50 is traveling on a road having a relatively small curvature radius (i.e., a sharp curve) with a relatively long distance to a target 60. While the vehicles are traveling around a sharp curve, the angle of the target 60 to the vehicle 50 becomes relatively large. Accordingly, the radar waves emitted forward from the radar device 100 on the vehicle 50 are obliquely incident on the rear surface of the target 60. As a result, the reflected waves weaken compared with a case in which the radar waves are vertically incident on the rear surface. In addition, the transmission waves emitted from the radar device 100 have a strong forward directivity, and thus oblique transmission waves from the radar device 100 are weak.

Furthermore, the path along which the reflected waves return from the target 60 to the radar device 100 includes a direct path and an indirect path. In the direct path, the reflected waves return directly to the radar device 100. In the indirect path, the reflected waves are reflected by a side wall 71 and return indirectly to the radar device 100. Sharp curves have a small distance difference between a direct path and an indirect path. Accordingly, when the distance to and the relative velocity of the target are calculated by frequency analysis (e.g., fast Fourier transform) of the received signals, it is challenging to separate a first distance and a first relative velocity from a second distance and a second relative velocity. The first distance and the first relative velocity are based on the direct reflected waves returned along the direct path. The second distance and the second relative velocity are based on the indirect reflected waves returned along the indirect path. Thus, the ambient environment illustrated in FIG. 9 is likely to reduce the accuracy of MIMO-based estimation of the azimuth of the target 60.

FIG. 10 illustrates a situation in which the vehicle 50 is traveling on a road having side walls 72 and 73 on both sides extending in the traveling direction of the vehicle 50. In such an ambient environment, two indirect reflected waves with different transmission and reception azimuths return to the radar device 100. One of the two indirect reflected waves is reflected by the side wall 71 and returned to the radar device 100, whereas the other is reflected by the side wall 72 and returned to the radar device 100. Additionally, the distance difference between the direct path and the indirect path is small, which makes it challenging to separate a first distance and a first relative velocity that are based on the direct reflected waves from a second distance and a second relative velocity that are based on the indirect reflected waves. In the ambient environment illustrated in FIG. 10, the azimuth estimated based on MIMO is likely to be determined as a ghost. That is, the azimuth estimated based on MIMO is likely to be determined as an azimuth in which no target exists. Thus, the ambient environment illustrated in FIG. 10 is likely to reduce the accuracy of MIMO-based estimation of azimuth of the target 60.

In the present embodiment, the processing device 30 adopts one of the first azimuth and the second azimuth as the azimuth of the target based on whether the ambient environment and/or the detected situation is likely to cause a decrease in the accuracy of MIMO-based azimuth estimation.

The first azimuth is the azimuth of the target estimated based on first received signals received by MIMO. The second azimuth is the azimuth of the target estimated based on the second received signal received by multi-input and single-output (MISO) or single-input and multi-output (SIMO).

Figure 11:
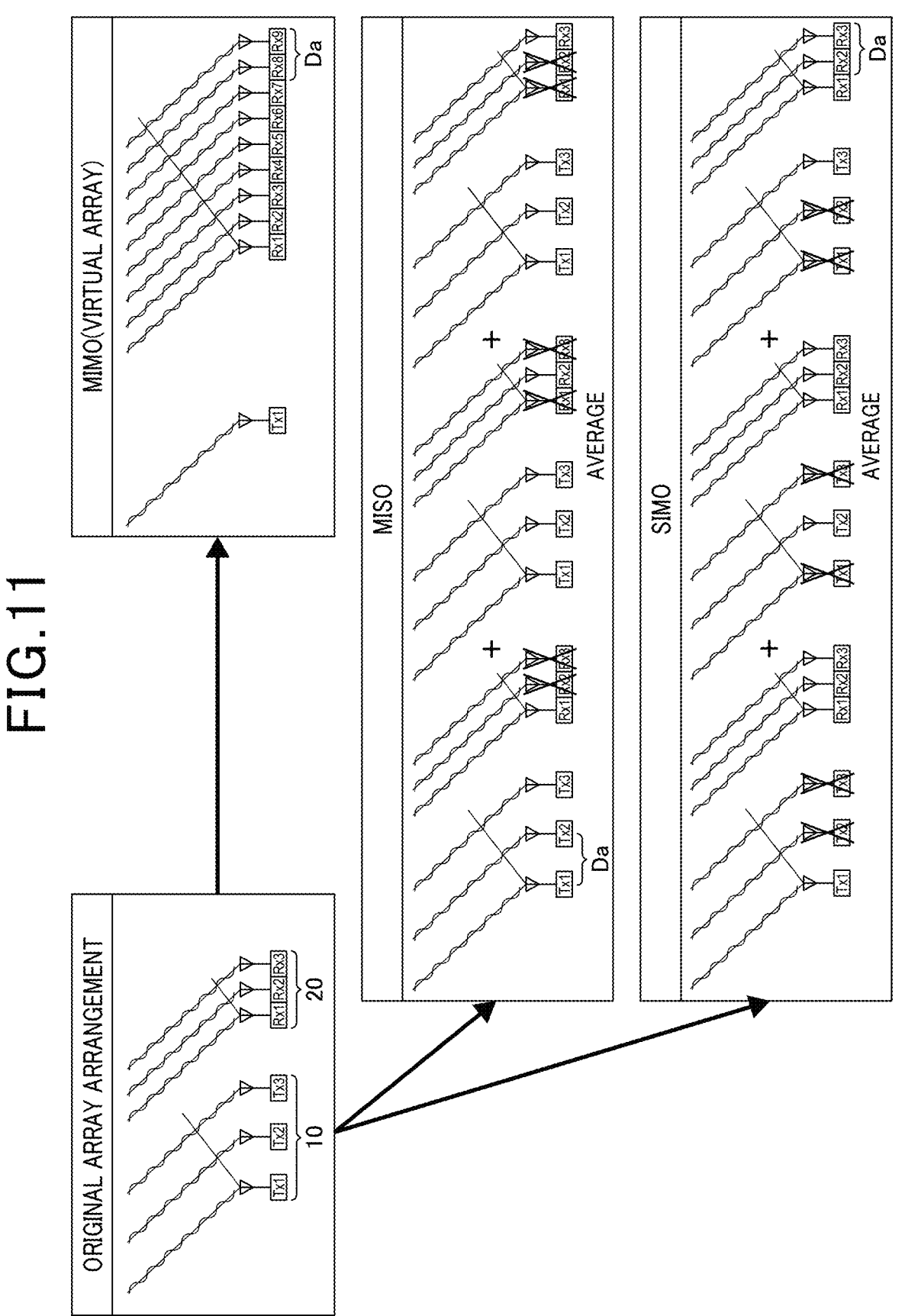
FIG. 11 illustrates MIMO, MISO, and SIMO.

FIG. 11 illustrates antennas used for MIMO, MISO, and SIMO. In the example illustrated in FIG. 11, the transmitting antenna unit 10 includes three transmitting antennas Tx1, Tx2, and Tx3, whereas the receiving antenna unit 20 includes three receiving antennas Rx1, Rx2, and Rx3.

As described above, in MIMO, the M transmitting antennas Txm and the N receiving antennas Rxn form an M×N virtual array. In MIMO, the processing device 30 estimates the first azimuth by coherently processing M×N first received signals received at the virtual array. The virtual array has an antenna interval Da.

In MISO, the M transmitting antennas Txm and one of the N receiving antennas Rxn form an antenna array. The processing device 30 estimates the first azimuth by, between transmissions, coherently processing M first received signals received at the antenna array. That is, in MISO, even when the transmission azimuth is different from the reception azimuth, the second azimuth is estimated based on M second received signals having a constant phase difference between the received signals. The antenna array has an antenna interval Da.

As illustrated in FIG. 11, in MISO, one receiving antenna may be sequentially selected from the N receiving antennas Rxn to acquire M second received signals N times. The processing device 30 may average the N by M second received signals to calculate M second received signals.

In SIMO, one of the M transmitting antennas Txm and the N receiving antennas Rxn form an antenna array. The processing device 30 estimates the second azimuth by, between receptions, coherently processing N second received signals received at the antenna array. That is, in SIMO, even when the transmission azimuth is different from the reception azimuth, the second azimuth is estimated based on N second received signals having a constant phase difference between the received signals. The antenna array has an antenna interval Da.

In SIMO, one transmitting antenna may be sequentially selected from the M transmitting antennas Txm to acquire N second received signals M times. The processing device 30 may average the M by N second received signals to calculate N second received signals.

The azimuth resolution in the first azimuth is higher than in the second azimuth because signals received by more antennas are used for the first azimuth. The processing device 30 thus preferentially adopts the first azimuth as the azimuth of the target, and in an ambient environment and/or a detected situation likely to cause a decrease in the accuracy of MIMO-based azimuth estimation, the device adopts the second azimuth as the azimuth of the target.

<1-3. Azimuth Estimation Processing>

Figure 12:
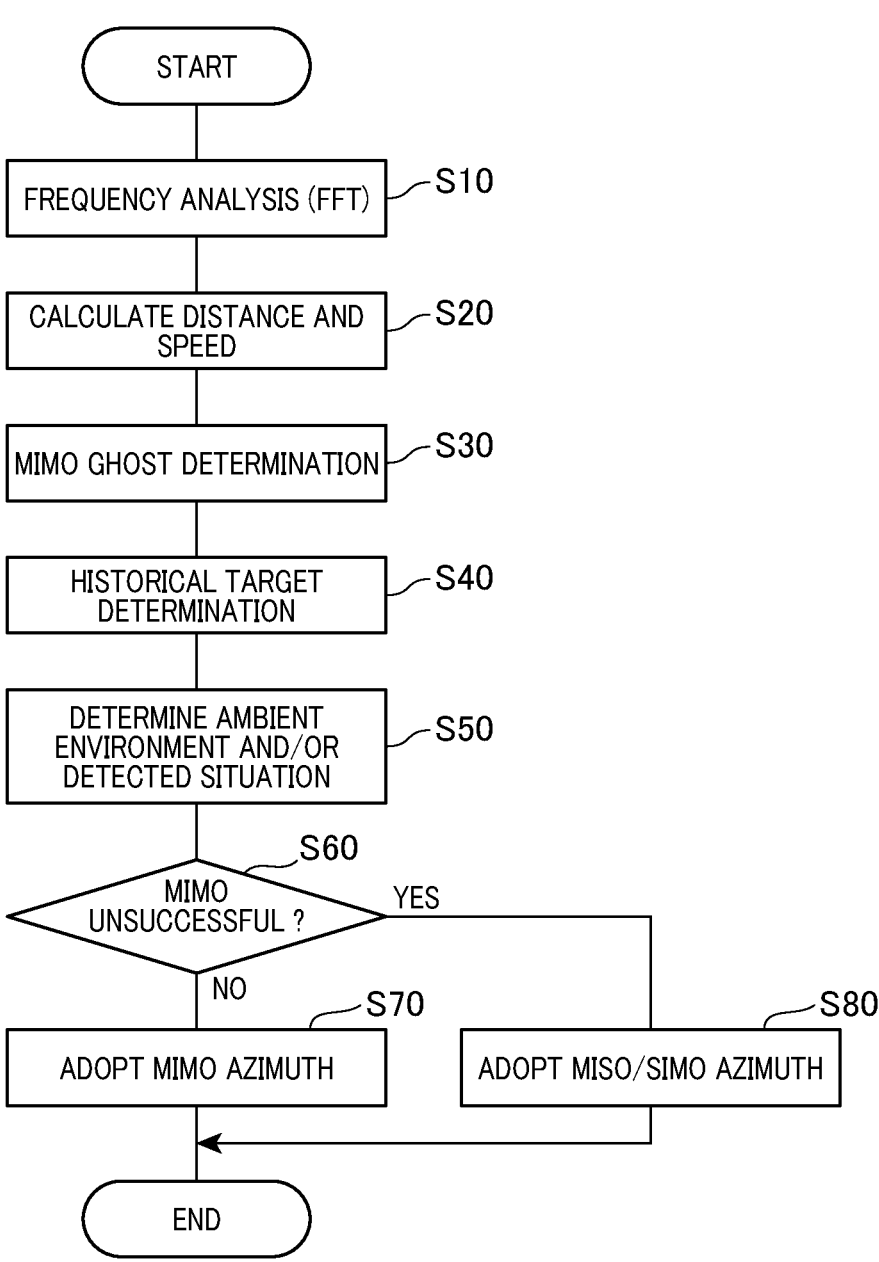
FIG. 12 is a flowchart illustrating a procedure of azimuth determination processing according to the embodiment.

Next, azimuth estimation processing performed by the processing device 30 will now be described with reference to a flowchart in FIG. 12. The processing device 30 repeatedly performs the azimuth estimation processing.

In S10, the processing device 30 applies an algorithm such as FFT to a frequency analysis of the first received signals output from the receiving antenna unit 20 to calculate a distance-speed spectrum, and extracts the peak of the calculated distance-speed spectrum. When the spectrum has a plurality of peaks, or when a plurality of targets are detected, the processing device 30 extracts the plurality of peaks.

Subsequently, in S20, the processing device 30 calculates the distance and speed of the target based on the extracted peak.

Subsequently, the processing device 30 executes the processing of S30 to S80 for each peak extracted in S10 (i.e., for each target). In S30, the processing device 30 determines, for each peak extracted in S10, whether the first azimuth estimated by MIMO is a ghost. More specifically, the processing device 30 calculates an error e1 described later and determines the extracted peak as a ghost if the calculated error e1 is equal to or greater than a determination threshold.

Subsequently, in S40, the processing device 30 determines whether the target based on the extracted peak is a historical target. That is, the processing device 30 determines whether the target based on the extracted peak is stored as a target previously detected and being tracked.

Subsequently, in S50, the processing device 30 determines the ambient environment and/or the detected situation of the radar device 100. Specifically, in S50, the processing device 30 executes determinations (i) to (ix) below.

(i) The ambient environment includes the curvature radius of the road being traveled by the vehicle 50. The processing device 30 extracts the geometry of the road in a road image output from the camera 80 and estimates the curvature radius based on the extracted geometry of the road. Alternatively, the processing device 30 may identify the road being traveled on the basis of the map information and the current-position information and estimate the curvature radius of the identified road. Alternatively, the processing device 30 may estimate the curvature radius on the basis of the amount by which the steering wheel of the vehicle 50 is operated. When the estimated curvature radius is smaller than a radius threshold, or represents a sharp curve, the MIMO is determined to be unsuccessful.

(ii) The ambient environment includes the distance calculated in S20. When the distance is greater than a distance threshold, the processing device 30 determines the MIMO to be unsuccessful.

(iii) When the curvature radius is smaller than the radius threshold and the distance is greater than the distance threshold, the processing device 30 determines the MIMO to be unsuccessful. That is, the processing device 30 makes a determination based on a combination of (i) and (ii).

(iv) The ambient environment includes the inclination of the target. The processing device 30 estimates the inclination of the target on the basis of the curvature radius of the road and the distance to the target. When the curvature radius is smaller than the radius threshold and the inclination of the target is equal to or greater than an inclination threshold, the processing device 30 determines the MIMO to be unsuccessful.

(v) The detected situation includes whether the target is a historical target and determined as a ghost. When the target is a historical target and the target is determined as a ghost, the processing device 30 determines the MIMO to be unsuccessful.

Figure 13:
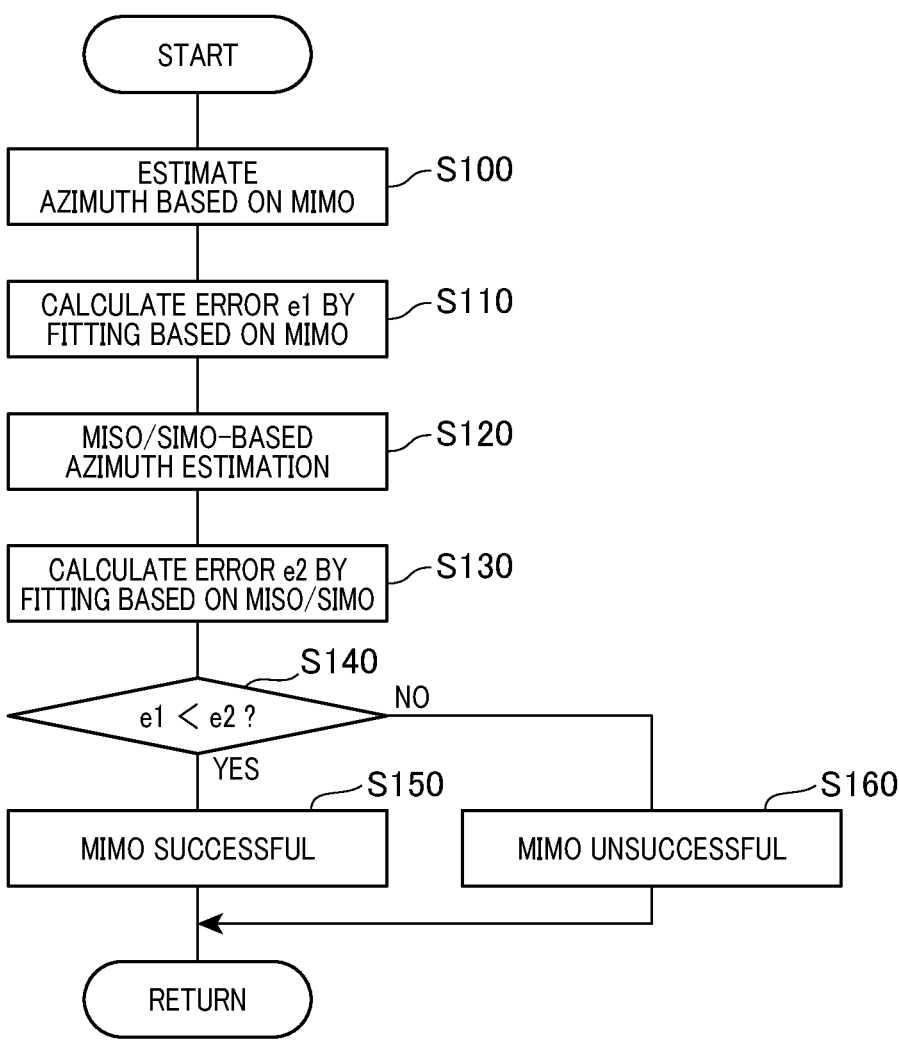
FIG. 13 is a flowchart illustrating one process of detected situation determination according to the embodiment.

(vi) The detected situation includes the error e1 and an error e2. The error e1 corresponds to the error between the first received signals and first reconstructed signals. The first reconstructed signals correspond to signals created by reconstructing the first received signals in the first azimuth on the assumption that the transmission azimuth is the same as the reception azimuth. Similarly to the error e1, the error e2 corresponds to the error between the second received signals and second reconstructed signals. In this case, the processing device 30 executes a subroutine illustrated in FIG. 13.

First, in S100, the processing device 30 applies a direction-of-arrival estimation algorithm to the first received signals received by the MIMO virtual array to estimate the first azimuth. The direction-of-arrival estimation algorithm is, for example, MUSIC, DBF, Capon, or ESPRIT.

Subsequently, in S110, the processing device 30 calculates the error e1 by fitting based on the first azimuth estimated in S100. Specifically, the processing device 30 calculates a modal matrix A1 in the first azimuth and also calculates a generalized inverse matrix B1 for the modal matrix A1. The modal matrix A1 is a K×(M×N) matrix. K denotes the number of calculated first azimuths. The processing device 30 further multiplies the generalized inverse matrix B1 by a first received signal vector x1 to calculate a power vector s1 in the first azimuth. The power vector s1 is a vector having K elements. The processing device 30 calculates the error e1 based on the equation, e1=abs(x1−A1s1). A1s1 corresponds to the first reconstructed signals of the first received signals. If the assumption that the transmission azimuth is the same as the reception azimuth is correct, then the first reconstructed signals are substantially the same as the first received signals, and the error e1 approaches zero.

Subsequently, in S120, the processing device 30 applies the direction-of-arrival estimation algorithm to the second received signals received by the MISO or SIMO array antenna to estimate the second azimuth.

Subsequently, in S130, the processing device 30 calculates the error e2 by fitting based on the second azimuth estimated in S120. Specifically, as in the processing of S110, the processing device 30 calculates a modal matrix A2 in the second azimuth and also calculates a generalized inverse matrix B2 for the modal matrix A2. The modal matrix A2 is an L×N or L×M matrix. L denotes the number of calculated second azimuths. The processing device 30 uses the generalized inverse matrix B2 and a second received signal vector x2 to calculate a power vector s2 in the second azimuth, and calculates the error e2 based on the equation, e2=abs(x2−A2s2).

Subsequently, in S140, the processing device 30 determines whether the error e1 is smaller than the error e2. If determining that the error e1 is smaller than the error e2 in S140, the processing device 30 determines the MIMO to be successful in S150. If determining that the error e1 is equal to or greater than the error e2, the processing device 30 determines the MIMO to be unsuccessful in S160.

Figure 14:
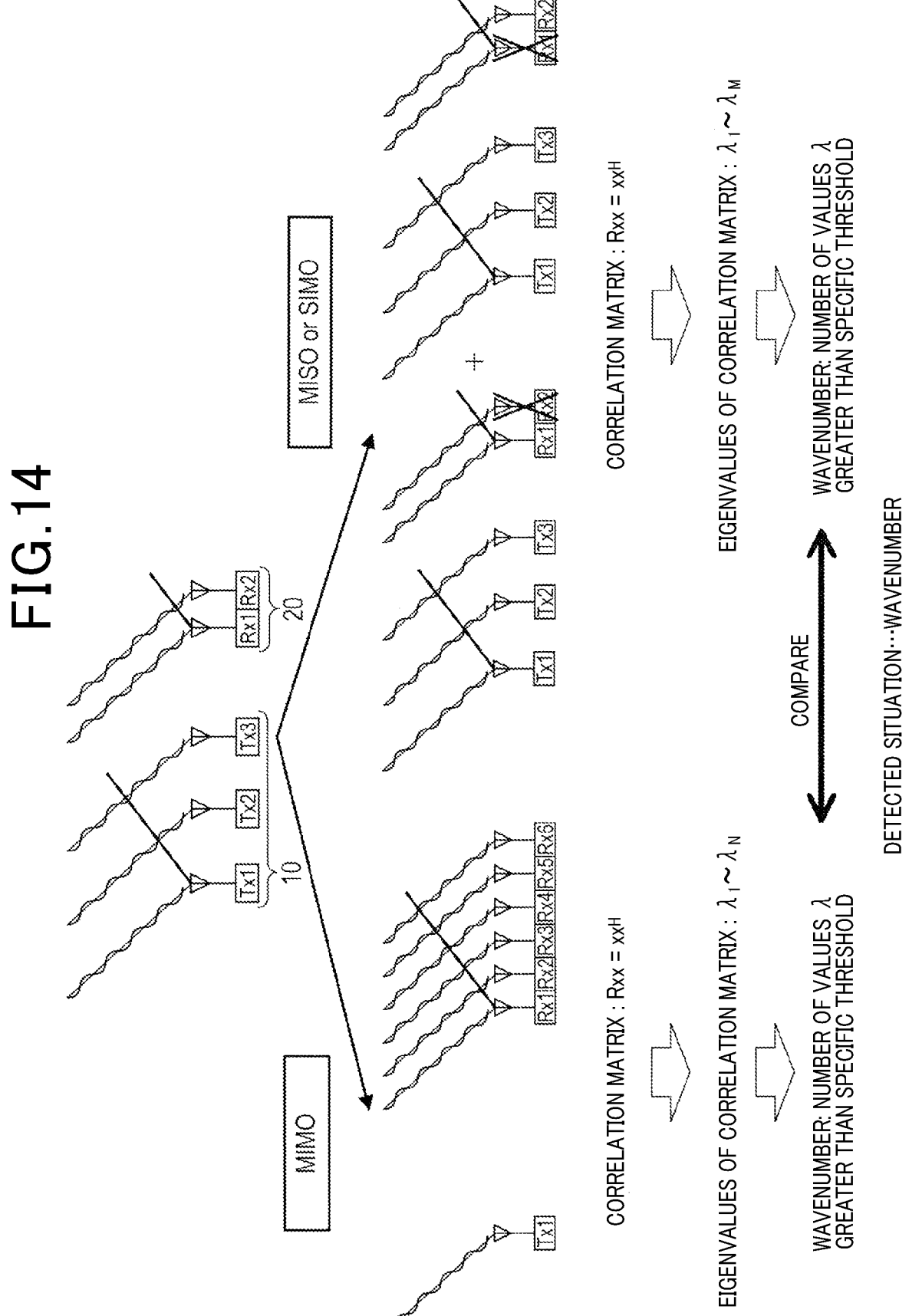
FIG. 14 illustrates the calculation of the wavenumber that is one detected situation according to the embodiment.

(vii) The detected situation includes a first wavenumber and a second wavenumber. As illustrated in FIG. 14, when calculating the first azimuth, the processing device 30 calculates the eigenvalues of a correlation matrix for the first received signals. Of the calculated eigenvalues, the processing device 30 determines the number of eigenvalues that are greater than a specific threshold as the first wavenumber. The first wavenumber corresponds to the wavenumber that have arrived at the MIMO virtual array.

Similarly, when calculating the second azimuth, the processing device 30 calculates the eigenvalues of a correlation matrix for the second received signal. Of the calculated eigenvalues, the processing device 30 determines the number of eigenvalues that are greater than a specific threshold as the second wavenumber. The second wavenumber corresponds to the wavenumber that have arrived at the MISO or SIMO array antenna.

As the number of incoming waves increases, the accuracy of azimuth estimation decreases. Thus, when the first wavenumber is smaller than the second wavenumber, the MIMO is determined to be successful. When the second wavenumber is smaller than the first wavenumber, the MIMO is determined to be unsuccessful.

Figure 15:
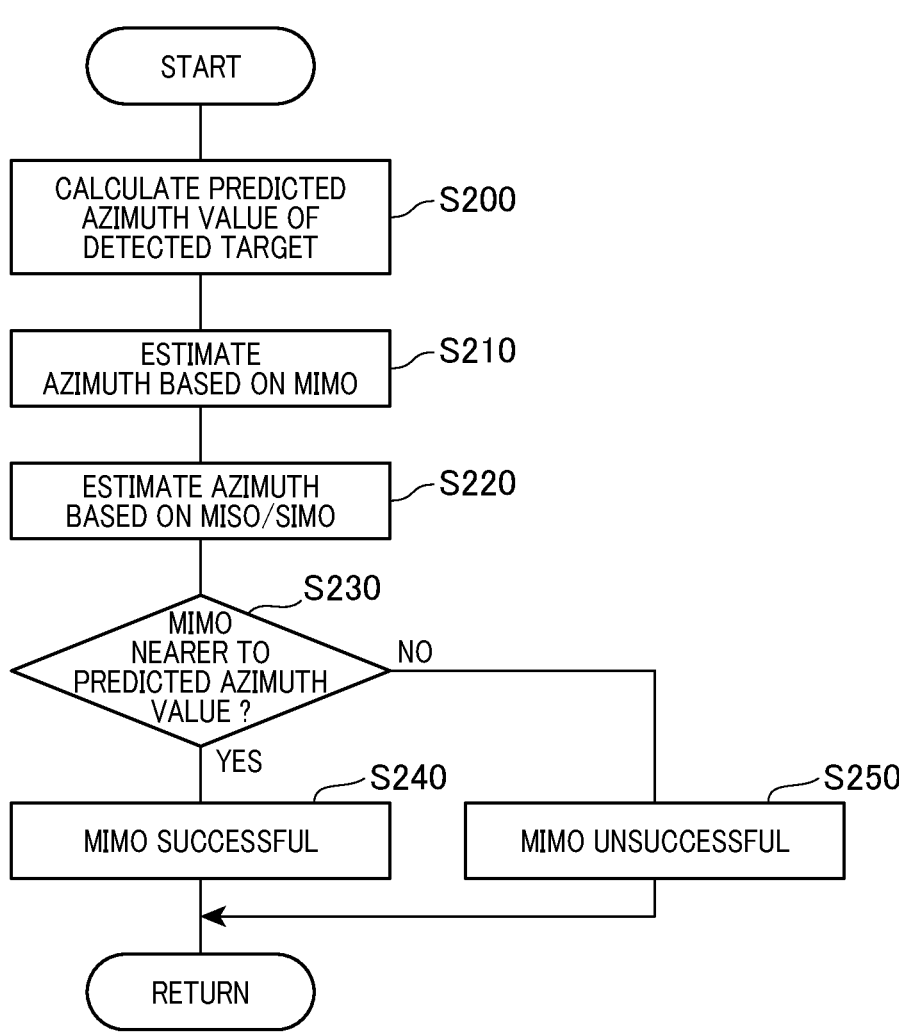
FIG. 15 is a flowchart illustrating another process of detected situation determination according to the embodiment.

(viii) The detected situation includes a predicted azimuth value predicted from previously detected information on a detected target. The detected target corresponds to a target stored as a historical target. The processing device 30 performs the determination of (viii) when the target corresponding to the peak extracted in S10 is already detected, and does not perform the determination of (viii) when the target corresponding to the peak extracted in S10 is a new target detected in the current processing period. In this case, the processing device 30 executes a subroutine illustrated in FIG. 15.

First, in S200, the processing device 30 predicts the azimuth of the target in the current processing period based on the previously detected information on the detected target to calculate a predicted azimuth value.

In S210, the processing device 30 estimates the first azimuth based on the first received signals received by the MIMO virtual array.

In S220, the processing device 30 estimates the second azimuth based on the second received signals received by the MISO or SIMO array antenna.

In S230, the processing device 30 determines whether the first azimuth estimated in S210 is nearer to the predicted azimuth value calculated in S200 than the second azimuth estimated in S220. If determining that the first azimuth is nearer to the predicted azimuth value than the second azimuth, the processing device 30 proceeds to the processing of S240 and determines the MIMO to be successful. If determining that the second azimuth is nearer to the predicted azimuth value than the first azimuth, the processing device 30 proceeds to the processing of S250 and determines the MIMO to be unsuccessful.

Figure 16:
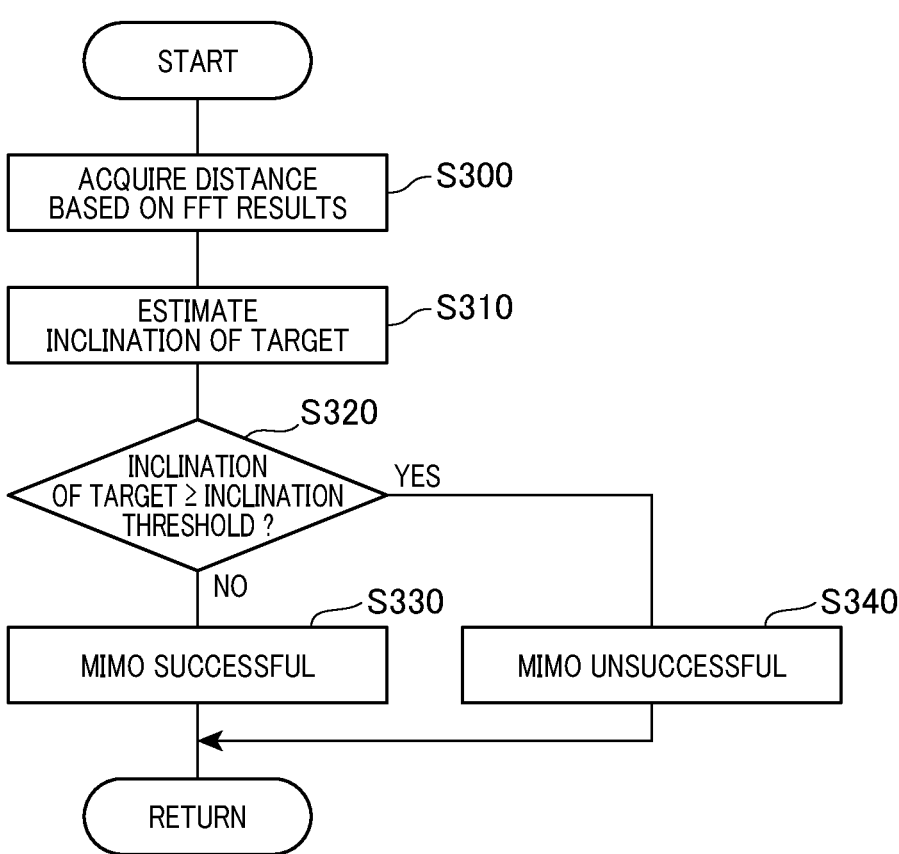
FIG. 16 is a flowchart illustrating another process of detected situation determination according to the embodiment.

(ix) The detected situation includes the inclination θ of the target 60 estimated on the assumption that the target 60 is a vehicle. In this case, the processing device 30 executes a subroutine illustrated in FIG. 16.

First, in S300, the processing device 30 acquires a direct distance La to the target based on the FFT results.

Figure 17:
FIG. 17 illustrates a technique for estimating the inclination of a target according to the embodiment.

Subsequently, in S310, the processing device 30 estimates the inclination θ. As illustrated in FIG. 17, the slope of the tangential line to the curve of the road with respect to the traveling direction of the radar device 100 (i.e., the vehicle 50) is calculated as the inclination θ. More specifically, the inclination θ is calculated using equation (1) below, the direct distance La, and the curvature radius Ra of the road. The processing device 30 calculates the curvature radius Ra of the road from a road image. Alternatively, the processing device 30 may calculate the curvature radius Ra of the road on the basis of the map information and the current-position information. Alternatively, the processing device 30 may estimate the curvature radius on the basis of the amount by which the steering wheel of the vehicle 50 is operated.

[Math. 1]

$$\theta = \tan^{-1}\left(\frac{La}{\mathrm{abs}(Ra)}\right) \times \frac{180}{\pi} \qquad (1)$$

Subsequently, in S320, the processing device 30 determines whether the inclination θ estimated in S310 is equal to or greater than a defined inclination threshold. If determining that the inclination θ is smaller than the inclination threshold, the processing device 30 determines the MIMO to be successful in S330. If determining that the inclination θ is equal to or greater than the inclination threshold, the processing device 30 determines the MIMO to be unsuccessful in S340.

In S50, the processing device 30 may not perform all the determinations of (i) to (ix). The processing device 30 may perform at least one of the determinations of (i) to (ix). The processing device 30 may omit redundant processing in (i) to (ix). For example, in a case where the determinations of (vi) and (viii) are performed, the processing device 30 estimates the first azimuth and the second azimuth in (vi) and may thus omit the estimation of the first azimuth and the second azimuth in (viii).

Subsequently, in S60, the processing device 30 determines whether the MIMO is unsuccessful. If the determinations of (i) to (ix) in S50 include the determination that the MIMO is unsuccessful, the processing device 30 determines the MIMO to be unsuccessful and proceeds to the processing of S70. If the determinations of (i) to (ix) in S50 do not include the determination that the MIMO is unsuccessful, the processing device 30 determines the MIMO to be successful and proceeds to the processing of S80.

In S70, the processing device 30 adopts the first azimuth estimated based on the MIMO as the azimuth of the target. In S50, depending on the determination made in (i) to (ix), the processing device 30 may not have calculated the first azimuth. When no first azimuth has been calculated, the processing device 30 calculates the first azimuth based on the first received signals in S70.

In S80, the processing device 30 adopts the second azimuth estimated based on the MISO or SIMO as the azimuth of the target. In S50, depending on the determination made in (i) to (ix), the processing device 30 may not have calculated the second azimuth. When no second azimuth has been calculated, the processing device 30 calculates the second azimuth based on the second received signals in S70.

<1-4. Advantageous Effects>

According to the first embodiment described in detail above, the following effects are achieved.

(1) The first azimuth higher in resolution can be calculated based on the first received signals affected by the difference between the transmission azimuth and the reception azimuth and received by the virtual array of more antennas. The second azimuth can be calculated based on the second received signals unaffected by the difference between the transmission azimuth and the reception azimuth. In addition, one of the first azimuth and the second azimuth is adopted depending on the ambient environment and/or the detected situation of the target. By adopting the first azimuth or the second azimuth depending on the ambient environment and/or the detected situation of the target, the processing device 30 can reduce the processing load compared with a case in which two-dimensional azimuth estimation is conducted. Therefore, the processing load can be reduced as well as the accuracy of azimuth estimation can be increased.

(2) On a sharp curve in which the curvature radius of the road is relatively small, a forward target turns at an angle. This weakens the direct reflection from the target, and also the transmission waves cannot hit the target at right angles, resulting in weak direct reflection. On a sharp curve, the paths of the direct reflection and the indirect reflection have a small difference between them. The sharp curve thus makes it challenging to separate the first distance and the first relative velocity based on the direct reflection from the second distance and the second relative velocity based on the indirect reflection, resulting in a decrease in the accuracy in the first azimuth. The processing device 30 can thus increase the accuracy of azimuth estimation by adopting the second azimuth when the curvature radius is smaller than a predetermined value.

(3) The processing device 30 can estimate the curvature radius of the road being traveled based on the geometry of the road in an image.

(4) The processing device 30 can estimate the curvature radius of the road being traveled based on the map information and the current-position information.

(5) As the distance to the target increases, it becomes more challenging to separate the first distance and the first relative velocity based on the direct reflection from the second distance and the second relative velocity based on the indirect reflection, resulting in a decrease in the accuracy in the first azimuth. The processing device 30 can thus increase the accuracy of azimuth estimation by adopting the second azimuth when the distance to the target is greater than a distance threshold.

(6) The processing device 30 adopts the first azimuth when the error e1 is smaller than the error e2 and adopts the second azimuth when the error e1 is greater than the error e2. This can increase the accuracy of azimuth estimation.

(7) The processing device 30 adopts the first azimuth when the first wavenumber is smaller than the second wavenumber and adopts the second azimuth when the first wavenumber is greater than the second wavenumber. This can increase the accuracy of azimuth estimation.

(8) The processing device 30 can increase the accuracy of azimuth estimation by adopting the second azimuth when the estimated target inclination is equal to or greater than an inclination threshold.

(9) The processing device 30 can increase the accuracy of azimuth estimation by adopting, of the first azimuth and the second azimuth, the azimuth nearer to the predicted azimuth value.

(10) The antenna interval Da of the virtual array is set to the same as the antenna interval Da of the antenna array. This can increase the accuracy of azimuth estimation.

2. Other Embodiments

Although an embodiment of the present disclosure has been described above, the present disclosure is not limited to the embodiment but may be implemented in various modified embodiments.

(a) In the above embodiment, the camera 80 is connected to the processing device 30; however, the camera 80 may not be connected for the processing device 30 that does not estimate the curvature radius of the road based on a road image. Furthermore, in the above embodiment, the GPS receiver 90 is connected to the processing device 30, and the map information is input to the processing device 30; however, for the processing device 30 that does not estimate the curvature radius of the road based on the map information and the current-position information, the GPS receiver 90 may not be connected to the processing device 30, and the map information may not be input to the processing device 30.

(b) In addition to the above-described radar device, the present disclosure may be implemented in a variety of forms such as a system including the radar device as a component, a program for causing a computer to function as the radar device, a non-transitory tangible storage medium such as a semiconductor memory storing the program, and an azimuth estimation method.

(Conclusion)

One aspect of the present disclosure is desirably directed to reducing the processing load and increasing the accuracy of azimuth estimation.

A radar device according to one aspect of the present disclosure includes a plurality of transmitting antennas, a plurality of receiving antennas, a first azimuth estimation unit, a second azimuth estimation unit, and a selection unit. The first azimuth estimation unit is configured to estimate a first azimuth by coherently processing first received signals received by a virtual array. The virtual array includes the plurality of transmitting antennas and the plurality of receiving antennas. The first azimuth is the azimuth of a target. The second azimuth estimation unit is configured to estimate a second azimuth by, between transmissions or receptions, coherently processing second received signals received by an antenna array. The antenna array includes at least one set of antennas. The at least one set of antennas includes the plurality of transmitting antennas and one of the plurality of receiving antennas, or the plurality of receiving antennas and one of the plurality of transmitting antennas. The selection unit is configured to adopt one of the first azimuth and the second azimuth depending on the ambient environment and/or the detected situation of the target.

An antenna device according to one aspect of the present disclosure includes a first azimuth calculation unit and a second azimuth calculation unit. The first azimuth calculation unit calculates the first azimuth based on the first received signals received by the virtual array of more antennas. Although the first received signals are affected by the difference between the transmission azimuth and the reception azimuth, the first azimuth is higher in resolution because the virtual array has more antennas. The second azimuth calculation unit calculates the second azimuth based on the second received signals unaffected by the difference between the transmission azimuth and the reception azimuth. In addition, one of the first azimuth and the second azimuth is adopted depending on the ambient environment and/or the detected situation of the target. The adoption of the first azimuth or the second azimuth depending on the ambient environment and/or the detected situation of the target enables the processing load to be reduced compared with a case in which two-dimensional azimuth estimation is conducted. Therefore, the processing load can be reduced as well as the accuracy of azimuth estimation can be increased.

An azimuth estimation method according to another aspect of the present disclosure transmits transmission waves from a plurality of transmitting antennas, estimates a first azimuth by coherently processing first received signals received by a virtual array, estimates a second azimuth by, between transmissions or receptions, coherently processing second received signals received by an antenna array, and adopts one of the first azimuth and the second azimuth depending on the ambient environment and/or the detected situation of the target. The virtual array includes the plurality of transmitting antennas and the plurality of receiving antennas. The first azimuth is the azimuth of a target. The antenna array includes at least one set of antennas. The at least one set of antennas includes the plurality of transmitting antennas and one of the plurality of receiving antennas or one of the plurality of transmitting antennas and the plurality of receiving antennas.

The azimuth estimation method according to the aspect of the present disclosure achieves the same effects as the above-described radar device.

What is claimed is:

1. A radar device comprising:
a plurality of transmitting antennas;
a plurality of receiving antennas;
a first azimuth estimation unit configured to estimate a first azimuth by coherently processing first received signals received by a virtual array, the virtual array including the plurality of transmitting antennas and the plurality of receiving antennas, the first azimuth being an azimuth of a target;
a second azimuth estimation unit configured to estimate a second azimuth by, between transmissions or receptions, coherently processing second received signals received by an antenna array, the antenna array including at least one set of antennas, the at least one set of antennas including the plurality of transmitting antennas and one of the plurality of receiving antennas or one of the plurality of transmitting antennas and the plurality of receiving antennas; and
a selection unit configured to adopt one of the first azimuth and the second azimuth depending on an ambient environment and/or a detected situation of the target.

2. The radar device according to claim 1, wherein
the radar device is mounted on a vehicle,
the ambient environment includes a curvature radius of a road being traveled by the vehicle, and
the selection unit is configured to adopt the second azimuth when the curvature radius is smaller than a predetermined value.

3. The radar device according to claim 2, further comprising:

a first curvature estimation unit configured to acquire an image of the road captured by a camera and estimate the curvature radius based on geometry of the road in the acquired image.

4. The radar device according to claim 3, further comprising:
a second curvature estimation unit configured to estimate the curvature radius based on map information and current-position information on the vehicle output from a GPS receiver, the current-position information indicating a current position of the vehicle based on the output of the GPS receiver.

5. The radar device according to claim 1, wherein
the detected situation includes a distance between the radar device and the target, and
the selection unit is configured to adopt one of the first azimuth and the second azimuth depending on the distance.

6. The radar device according to claim 1, wherein
the detected situation includes a first error and a second error, the first error is an error between first reconstructed signals and the first received signals, the second error is an error between second reconstructed signals and the second received signals, the first reconstructed signals are signals created by reconstructing the first received signals in the first azimuth, the second reconstructed signals are signals created by reconstructing the second received signals in the second azimuth, and
the selection unit is configured to adopt the first azimuth when the first error is smaller than the second error and adopt the second azimuth when the first error is greater than the second error.

7. The radar device according to claim 1, wherein
the first azimuth estimation unit is configured to estimate a first wavenumber being a number of first incoming waves based on an eigenvalue of a correlation matrix for the first received signals,
the second azimuth estimation unit is configured to estimate a second wavenumber being a number of second incoming waves based on an eigenvalue of a correlation matrix for the second received signals,
the detected situation includes the first wavenumber and the second wavenumber, and
the selection unit is configured to adopt the first azimuth when the first wavenumber is smaller than the second wavenumber and adopt the second azimuth when the first wavenumber is greater than the second wavenumber.

8. The radar device according to claim 1, wherein
the target includes a previously detected target,
the detected situation includes a predicted azimuth value predicted from previously detected information and representing an azimuth of the previously detected target, and
the selection unit is configured to adopt the first azimuth or the second azimuth which is nearer to the predicted azimuth value.

9. The radar device according to a claim 1, further comprising:
an inclination estimation unit configured to estimate an inclination of the target on condition that the target is a vehicle,
wherein the detected situation includes the inclination of the target estimated by the inclination estimation unit, and the selection unit is configured to adopt the second azimuth when the inclination of the target is equal to or greater than an inclination threshold.

10. The radar device according to claim 1, wherein the virtual array has an antenna interval identical to an antenna interval of the antenna array.

11. An azimuth estimation method comprising:

transmitting transmission waves from a plurality of transmitting antennas;

estimating a first azimuth by coherently processing first received signals received by a virtual array, the virtual array including the plurality of transmitting antennas and a plurality of receiving antennas, the first azimuth being an azimuth of a target;

estimating a second azimuth by, between transmissions or receptions, coherently processing second received signals received by an antenna array, the antenna array including at least one set of antennas, the at least one set of antennas including the plurality of transmitting antennas and one of the plurality of receiving antennas or one of the plurality of transmitting antennas and the plurality of receiving antennas; and adopting one of the first azimuth and the second azimuth depending on an ambient environment and/or a detected situation of the target.

* * * * *